Jan. 3, 1961     C. F. FEISER, JR     2,966,878

OVERLOAD INDICATOR FOR SLING CHAIN AND THE LIKE

Filed Aug. 21, 1959

INVENTOR.
CHARLES F. FEISER, JR.

BY

ATTORNEY

United States Patent Office 2,966,878
Patented Jan. 3, 1961

2,966,878

OVERLOAD INDICATOR FOR SLING CHAIN AND THE LIKE

Charles F. Feiser, Jr., York, Pa., assignor to Campbell Chain Company, York, Pa., a corporation of Pennsylvania Filed Aug. 21, 1959, Ser. No. 835,327

5 Claims. (Cl. 116—114)

The present invention relates to draft members, and more particularly, sling members such as sling cables or sling chains which are proof-tested for a predetermined load and have combined therewith indicating means which visibly disclose when the proof-test load has been exceeded in order to provide safety for workmen such as riggers, stevedores, and the like, who are subjected to hazards from the breaking of draft or sling members during the hoisting of loads thereby.

Draft or sling members such as steel cables, ropes made from vegetable or plant fibers having eyelets spliced in opposite ends thereof, and sling chains long have been used between a load to be hoisted and a hoisting hook or sheave in many different types of rigging and construction work, as well as stevedore activities incident to the loading and unloading of ships. Usually, there is a main link on one end of the sling member and a hook or additional ring on the opposite end thereof. However, there usually is no ready indicating means available with any of these types of sling members which will indicate when the load for which they have been proof-tested, or which they are intended to withstand without breaking, has been reached or exceeded.

There have been efforts made heretofore to provide indicating means in cable slings but such means required the severing of the cable in order to install the same. Said means also included frangible rod members which were broken when the load for which the cable had been proof-tested was exceeded. Accordingly, it was possible with such type of indicating means for a workman or a foreman to replace such frangible means or have the same replaced so as to restore the cable to operation without actually retiring the cable from use as should be done once the proof-tested load of the cable has been reached or exceeded.

The principal purpose of the present invention is to utilize an extremely simple indicating means which, in the preferred embodiment thereof, comprises a circular link which is endless and preferably is inserted between one end of a sling member, specifically a body chain of a chain sling, and a master link which is connected to one end of the sling member. The indicating link is stronger than any individual link of the body chain and the endless, circular indicating link will maintain its shape substantially up to and exceeding an imposition of a load thereon equal to the working load limit for which the sling member is rated. However, upon loads in excess of the working load limit and under the proof-test load being imposed upon the sling member, the indicating link will be distorted from its normal circular shape sufficiently that even casual visual observation of the link will indicate that the proof-test limit of the sling member has been reached or exceeded, whereupon an inspector can quickly determine such fact and order the replacement of the sling member by a new one which is in safe condition.

It will be understood that in the preferred embodiment of the invention, the indicating link is sufficiently strong that the sling member will break before the indicating link will break. Further, as is well known by any expert in the field of draft appliances and particularly sling member such as sling chains, the proof-test limit of such sling member is substantially greater than the working load limit thereof, while the breaking force required to break the sling member is substantially twice the proof-test rating for the sling member, especially as applied to sling chains.

A further object of the invention is to employ a circular endless indicating link in the sling member, such indicating link being endless and therefore not readily replaced upon the site where the sling member usually is employed. Hence, the indicating means contemplated by the present invention is substantially foolproof by making it approximately impossible for a careless and conniving employee or supervisor to remove the tell-tale indications of the distortions of the indicating link. By a little practice, even an average workman can quickly inspect the condition of the indicating links of the sling members of the type described, whereby he can request an inspection of the sling members, especially if such request will be honored by rules pertaining to the workman's employment such as imposed by labor unions and the like. Essentially, the indicating means comprising the present invention are foolproof in that they cannot readily be tampered with to remove the indicating effects of the indicating link and this constitutes one of the major improvements afforded by the present invention.

Although the drawing of the instant application illustrates the invention applied to a sling chain, it is to be understood that the invention can be applied with equal facility to a sling cable, sling rope, or any other similar sling means, within the purview of the spirit of the invention.

Figure 1:
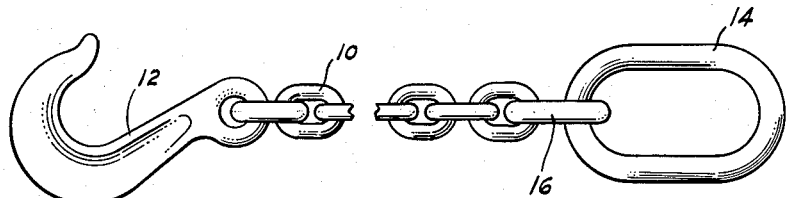
Fig. 1 is a side elevation of an exemplary sling chain in which an indicating link has been included in accordance with the principles of the invention, the body chain of said sling chain being partially removed intermediately of the ends thereof to foreshorten the view.
Figure 2:
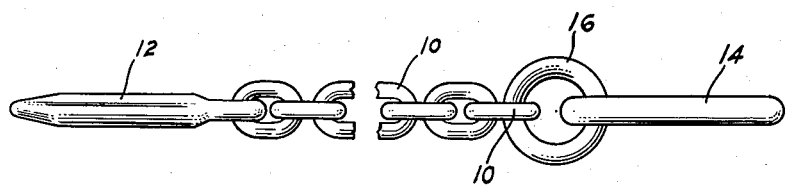
Fig. 2 is a view similar to Fig. 1 but showing the chain position at 90° to the position thereof illustrated in Fig. 1.

In applying the present invention to a sling chain, attention is directed to Figs. 1 and 2 wherein the desired length of pre-formed body chain 10 is mounted between the eyelet of a hook 12 and, normally, the opposite end of the body chain is connected to the large, heavy master link 14. In accordance with the principles of the invention however, a preferably circular indicating link 16, which has higher ultimate strength than the body chain 10, is mounted between the end of the body chain opposite the hook 12 and the master link 14 as clearly indicated in Figs. 1 and 2.

Assuming that hook 12 has a higher yield limit than body chain 10, the latter will be the weakest portion of sling assembly.

Whereas the body chain 10 preferably is formed from heat treated alloy chain, the preferred composition of the indicating link 16 is stainless steel of suitable composition, it clearly being seen that the cross-sectional area of the link 16 is greater than the cross-sectional area of the links of the body chain 10. Although it is preferred that the indicating link 16 be formed from stainless steel however, such composition is not to be regarded as restrictive since other iron or steel alloys may be employed, as well as non-ferrous metals may be used if desired, especially when the physical characteristics of the metal are selected appropriately commensurate with the size of the link and the cross-sectional dimension thereof.

Figure 3:
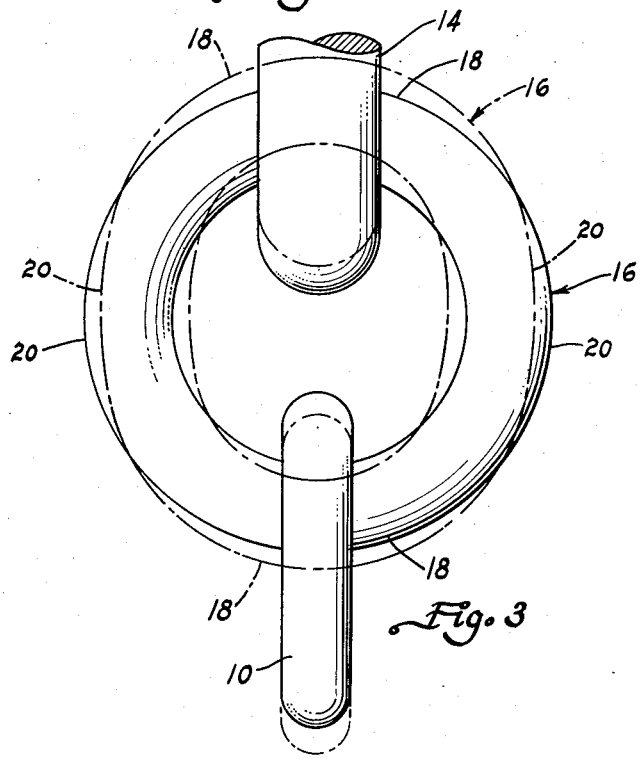
Fig. 3 is a fragmentary, enlarged view of one end of the body chain, the master link which is fragmentarily illustrated, and, in full lines, the circular indicating link is shown in its normal position, whereas in broken lines, an exemplary distorted position thereof is shown as, for example, after the proof-test limit has been reached or exceeded.

Referring to Fig. 3, an exemplary illustration is shown wherein, in a scale larger than that employed in Figs. 1 and 2, the indicating link 16 is shown in full lines in its initial, circular condition. Basically, the link 16 comprises a pair of portions 18 which are arranged to be pulled apart when the proof-test range of force is imposed upon the chain, the portions 18 being connected by another pair of at least theoretical portions 20 which may be referred to accurately as connecting portions for the pair of portions 18. It will be understood of course that when the indicating link 16 is new and non-distorted, it will not be possible to readily distinguish the portions 18 from the portions 20. However, when the indicating link 16 is subjected to a load, the portions 18 and 20 then will be fixed for any given pulling load imposed upon the chain, it being understood that the portions 18 are adjacent the link of the body chain 10 and the master link 14 which respectively are positioned relative to the indicating link 16 at opposed positions to each other, substantially 180° apart.

The illustration shown in Fig. 3 is intended to be accurate as to proportions of a specific example of the sizes of body chain links 10, master link 14, and stainless steel indicator link 16, it being understood that the body chain 10 is formed from heat treated alloy chain. It will be seen from the dotted line position of the indicating link 16, as compared with the solid line or normal position and shape thereof that when an exemplary chain is subjected to the proof-test load limit, the portions 18 of the link 16 will be moved to the broken line positions shown in Fig. 3, whereas the connecting portions 20 will be moved toward each other as clearly indicated by the broken lines in Fig. 3. Accordingly, the indicating link 16 is rendered substantially oval and the link assumes such ovality as a permanent condition upon the proof-test limit being reached. Such ovality is readily discernable by the human eye with only a slight amount of experience, whereby an inspector and even a workman can determine that the proof-test limit of the chain has substantially been reached or exceeded when the indicating link 16 has been distorted or "ovalized" to the extent indicated by the broken lines in Fig. 3, for example.

One major advantage to utilizing an initially circular indicating ring or link 16 in a sling member such as a chain, cable, rope or the like, lies in the fact that such indicator ring or link is endless, whereby the same can not be readily removed from the chain or other form of sling member so as to replace an ovalized ring by a new circular one, for example. Further, particularly where the circular metallic ring or link 16 is mounted in a sling chain, it is possible to make up a complete sling chain of any design or size simply by utilizing standard stock chain which previously has been heat treated and tested, welding in the ring to such previously heat treated and tested body chain and master link, so as to serve as a connecting link therefor, followed by testing of the ring itself. Normally, according to modern manufacturing principles, a sling chain is proof-tested by the manufacturer before it is sold to a customer. By so doing, the manufacturer knows that the chain will withstand the proof-test load for which it is rated.

After manufacturing a sling chain in accordance with the principles of the present invention however, as described above, to proof-test the chain by simply pulling upon the hook 12 and master link 14 would result in ovalizing the indicator link or ring 16. To prevent such ovalizing, a suitable plug which closely conforms to the shape of the opening shown in the interior of link 16 as viewed in Fig. 2 may be inserted in said opening so as to accommodate portions of the master link 14 and the endmost body link 10. By the use of such inserted plug, it is impossible for the indicator ring or link 16 to become distorted but nevertheless said ring or link will be subjected to a load equal to the proof-test amount for which the chain is rated. Following such testing, the plug is removed and the chain is ready to be sold to a customer.

Although the manufacturing operations described above relative to the formation of a sling chain including indicating ring or link 16 could not be followed when applying such ring or link to a rope sling, nevertheless the ring 16 could be fabricated, proof-tested independently of a sling and then included in a rope sling by inserting the rope through the indicating ring and splicing the end of the rope into the body thereof to form a loop at the end of the rope to which the ring 16 is attached. The manufacturing operation described relative to forming a sling chain however can be applied to the formation of cable slings which may or may not be proof-tested independently of the indicator ring 16 prior to the same being connected between one eyelet end of the sling cable and the master link, by welding the initially separated ends of the indicating ring or link 16.

While the invention has been described and illustrated in its preferred embodiment, and has included certain details, it should be understood that the invention is not to be limited to the precise details herein illustrated and described since the same may be carried out in other ways falling within the scope of the invention as claimed.

I claim:

1. A sling unit proof-tested for a predetermined load limit in excess of the normal working load limit and connectable between a load and a pulling force, said sling including at least two spaced elements, and an indicating element of stainless steel-like material attached to said elements to extend therebetween, said stainless steel-like element having a distortable curved portion within said space between said elements, said distortable portion extending to one side of the line of force applied to the sling and having a higher ultimate strength than the weakest element of the sling unit but lower yield strength than said sling, whereby mere visual observation of the distortion of said indicating element will indicate if the working load limit of the sling unit has been exceeded, the strength of said indicating means being adequate to withstand the working load limit without appreciable distortion.

2. The sling unit set forth in claim 1 further characterized by said spaced elements of said unit comprising a metallic chain and a metallic master ring, and the stainless steel-like indicator element interconnecting the same.

3. The sling unit set forth in claim 1 further characterized by said indicator element being a circular ring of stainless steel-like material.

4. The sling unit set forth in claim 1 further characterized by said spaced elements of said unit comprising a heat-treated steel body chain and a steel master ring, and the indicator element being a circular ring of stainless steel-like material connecting said spaced elements.

5. The sling unit set forth in claim 4 further characterized by said indicator ring being larger in diameter than the length of the links of said body chain.

References Cited in the file of this patent

UNITED STATES PATENTS

| | | |
|---|---|---|
| 1,485,888 | Schonberg | Mar. 4, 1924 |
| 2,670,951 | Lucky | Mar. 2, 1954 |

FOREIGN PATENTS

| | | |
|---|---|---|
| 58,618 | France | Oct. 21, 1953 |